US008812965B2

(12) United States Patent
Walker et al.

(10) Patent No.: US 8,812,965 B2
(45) Date of Patent: Aug. 19, 2014

(54) CREATION AND PUBLISHING OF VIRTUAL COMPONENTS

(75) Inventors: Jeffrey A. Walker, Huntsville, AL (US);
Kristopher C. Kasprzak, Huntsville, AL (US); Arthur S. Patrick, Madison, AL (US); Daniel Staples, Madison, AL (US); Prasad Pingali, Madiso, AL (US); Anthony E Tassone, Madison, AL (US); Michael R. Mathis, Athens, AL (US); Aditya Gurushankar, Huntsville, AL (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2664 days.

(21) Appl. No.: 11/143,878

(22) Filed: Jun. 1, 2005

(65) Prior Publication Data
US 2006/0277005 A1     Dec. 7, 2006

(51) Int. Cl.
*G06F 3/048*     (2013.01)
(52) U.S. Cl.
USPC .......................................................... 715/762
(58) Field of Classification Search
USPC ........ 703/1; 706/919–923; 715/964, 762, 763
See application file for complete search history.

(56) References Cited

U.S. PATENT DOCUMENTS

| | | | | |
|---|---|---|---|---|
| 5,119,307 A | * | 6/1992 | Blaha et al. | 700/107 |
| 5,748,943 A | * | 5/1998 | Kaepp et al. | 703/1 |
| 5,815,154 A | * | 9/1998 | Hirschtick et al. | 715/853 |
| 6,063,128 A | * | 5/2000 | Bentley et al. | 703/6 |
| 6,219,049 B1 | * | 4/2001 | Zuffante et al. | 715/764 |
| 6,219,055 B1 | * | 4/2001 | Bhargava et al. | 715/850 |
| 6,559,860 B1 | * | 5/2003 | Hamilton et al. | 715/700 |
| 6,636,211 B2 | * | 10/2003 | Chartier et al. | 345/420 |
| 7,085,776 B2 | * | 8/2006 | Callahan | 707/104.1 |
| 2004/0189724 A1 | * | 9/2004 | Golibrodski et al. | 345/964 |

FOREIGN PATENT DOCUMENTS

WO     WO 2004/079602 A2     9/2004

OTHER PUBLICATIONS

Scholes, Adrian: "Reap the Advantages of a Virtual Design" [Online]; Aug. 16, 2004, pp. 1-2 XP002406015.
"AutoVue 18—MCAD/EDA Visualization Collaboration & Digital Mockup" [Online]; Nov. 21, 2004, pp. 1-2 XP002406016.
Lee K et al: "A hierarchical data structure for representing assemblies: part 1" Computer Aided Design, Elsevier Publishers BV., Barking, GB, vol. 17, No. 1, Jan. 1985, p.

* cited by examiner

*Primary Examiner* — Thanh Vu

(57) ABSTRACT

A method for use in CAD modeling software to define product structure based on virtual components created independent from geometry and without the need to create files on disk. With the additional capability of assigning geometry to the virtual components of the product structure that sets and orients the virtual components and manages multiple occurrences of like components. Further, the virtual component are published into real components with automatic 3D file creation completed.

3 Claims, 15 Drawing Sheets

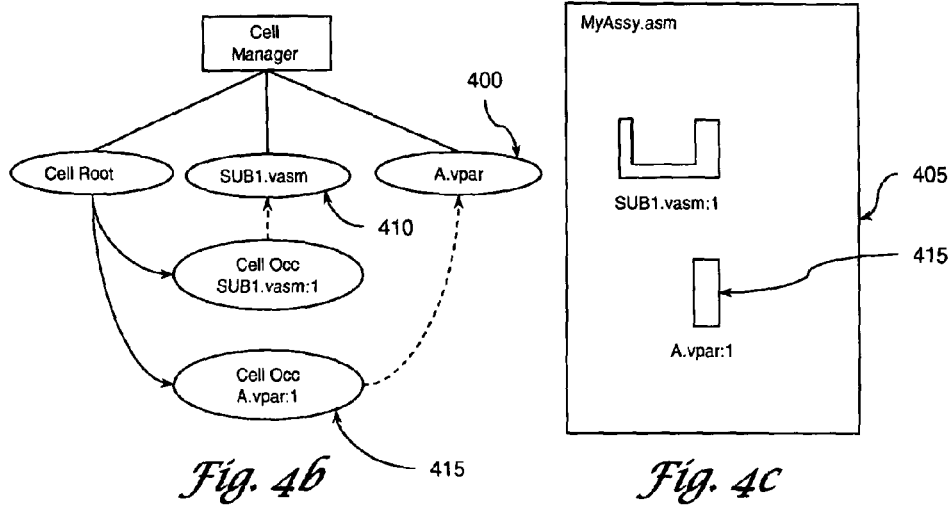
*Fig. 4b*
*Fig. 4c*
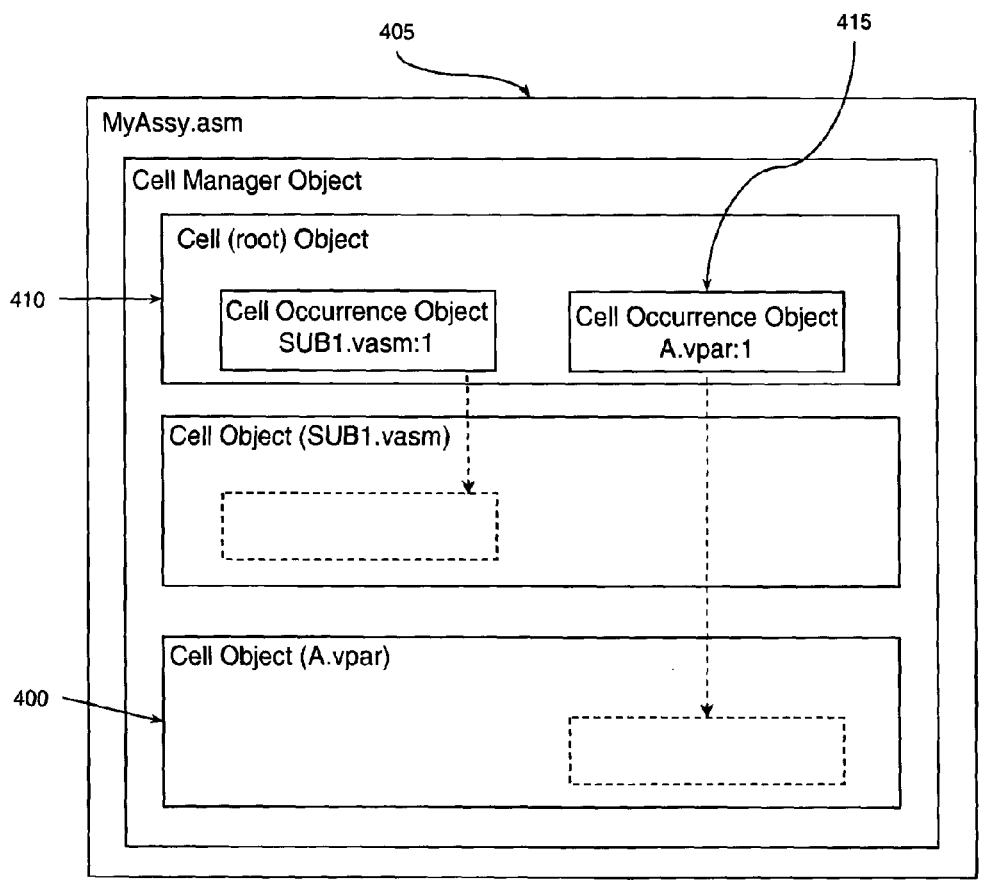
*Fig. 4a*

2000

CREATION AND PUBLISHING OF VIRTUAL COMPONENTS

TECHNICAL FIELD

The invention relates in general to computer-aided design, and in particular to mechanical assembly design of three-dimensional components.

BACKGROUND

Designers, such as engineers, architects, and the like, commonly use a computer-aided design (CAD) system to digitally represent a physical object. Today CAD systems can represent the object in not only two-dimensions (2D) along a two-plane coordinate system, e.g. an x-y axis, but also in three-dimensions (3D) along a three-plane coordinate system, i.e. an x-y-z axis, using a technique known as solid modeling.

Solid modeling is a term that refers to a set of techniques that can be used to create and store computer based representations of the physical objects. A number of solid modeling techniques have evolved over the years for providing computer-based representations of three-dimensional parts, for example parametric modeling.

Both concept and production designs can begin at a top level, and propagate down to the simple single component. Additionally, concept and production design can follow a bottom-up path where pre-defined components define the assembly. Regardless, the designs of the mechanical assembly are comprised of three basic ingredients: (1) a product structure, (2) an optional 2D layout, and (3) 3D components.

In the current art the product structure and the layout are defined at separate times, and usually through separate applications. Existing solutions focus on providing tools for the modeling of the 2D layout in a pure 2D environment without regard for component definition. This method burdens the designer with manually managing the 2D constructions using primitive techniques such as element grouping to define and manage the component definition and without a product structure.

Defining a product with a 2D layout with no concept of a product structure poses many problems. One problem is that a 2D layout does not provide a method for associating the 2D geometry to the product structure. Thus a 2D geometry must be created for every component in an assembly when even similar components exist. A common example is with a circular pattern of mounting bolts where the 2D geometry for each bolt must be created, and as each of the bolts may be slightly rotated, a simple copy operation to duplicate the 2D geometry cannot be done due to the rotational requirement. With this scenario, representation of the bolts in the product structure would reveal one separate component item for each bolt, when in practice the component would simply have a quantity specified, e.g., 8 bolts as opposed to Bolt: 1, Bolt: 2.

Likewise, other known solutions focus on product structure where the structure is derived from 3D components as listed in the assembly. However, this approach also has many drawbacks. For example, it is often hard to initially conceptualize a project fully in 3D; 2D layout is a preferable method for understanding preliminary overall concepts. Second, systems most often require multiple 3D files to correctly generate the product structure and appropriate nesting of subassemblies within an assembly. Transitioning between the various 3D files, as well as managing the large quantity of data this generated, can be time consuming and cumbersome.

And finally, each of the 3D components must be available and added to the assembly in order to create the product structure.

Thus there is a need for a system that can solve the above stated problems.

SUMMARY

The present invention overcomes the problems of the prior art and provides for the seamless and unencumbered usage of assembly based on a product structure referring to no external files and the integration of product structure where 2D geometry can be associated with the items. This integration allows the designer the freedom to create the product structure independent from the layout and then manage the 2D layout with the product structure. Once the design is ready for the next step, the assembly can be converted to an assembly that is based on externally linked files.

Additionally, the present invention solves the problem in top-down assembly design seen in other products on the market by simplifying the assembly design process.

A feature of the present invention is a product structure developed that is independent of external files. This will allow the user to develop the complete product structure without having to reference or create external files. The product structure is contained in a single file and can be considered a place holder for components to be designed or referenced later in the design process. Users also need the ability to define the product structure with any level of complexity of nested sub-assemblies, and track property information for each unique item such as part numbers, descriptions, authors, etc.

Another feature is the ability to associate specific groups of 2D geometry in the assembly file to an item in the product structure. Since the product structure can have multiple instances of the same component, the 2D layout must be able to accommodate duplicate geometry as well. As described above the user need only create 2D geometry of a single bolt and use that geometry repeatedly for the remainder of the common items. The orientation established in the initial instance can be used to control the orientation of the subsequent instances.

And another feature is the ability to convert the product structure of the assembly into an assembly where all items in the product structure are based on external files. During that process, any information captured within each item in the product structure, e.g., associated 2D geometry, property information, instance definition, and orientation control, should be propagated to the actual external file. That propagated information from the file needs to be accounted for back in the assembly.

Other advantages or features of the present invention will be set forth in part in the description and in the drawings that follow, and, in part will be learned by practice of the invention. The present invention provides a method of creating a three-dimensional assembly representation, comprising the steps of: creating a plurality of components; publishing an assembly comprising said plurality of components comprising the step of: creating a file structure comprising said assembly wherein each of said components is associated with a plurality of instance data; and wherein said instance data of said components comprises at least data pertaining to an orientation and an orientation; whereby a three-dimensional assembly representation is created. The three-dimensional assembly representation is created using a structure editor to display a structure composed of said plurality of components. The three-dimensional assembly representation is created using a structure editor to display a structure composed of said plurality of components and said structure editor displays said plurality of components in an indented tree view. The plurality of components are one of a real component and a virtual component. The publishing step further comprises the step of creating a computer readable file from said file structure. The publishing step further comprises the step of associating geometry, where said geometry comprises one of real or virtual. The instance data comprises a property data. The instance data comprises a property data and said property data comprises a bill of material. The instance data comprises a geometry. The instance data comprises an occurrence data. The instance data comprises an occurrence data and said occurrence data comprises one of a master data and a slave data.

Except as may be explicitly indicated otherwise, the following definitions apply: assembly, n., a single file listing structure composed of at least two components; component, n., a part or an assembly that is either a real component or a virtual component; product structure, n., a hierarchical listing of components that are in an assembly, and typically represented in a nested-tree form where branches are subassemblies with components as leaves; publish, v., a process of converting an assembly with a product structure comprised of real or virtual components into an assembly where all items in the product structure reference external files; real component, n., a part or assembly that references an external file; subassembly, n., a structure composed of at least two components, and part of a larger assembly; and virtual component, n., a part or assembly located in a virtual component structure editor, but having no files or 3D form associated to it.

The present invention will now be described with reference made to the following Figures that form a part hereof, and which is shown, by way of illustration, an embodiment of the present invention. It is understood that other embodiments may be utilized and modifications may be made without departing from the scope of the present invention.

BRIEF DESCRIPTION OF THE DRAWINGS

A preferred exemplary embodiment of the present invention will hereinafter be described in conjunction with the appended drawings, wherein like designations denote like elements, and:

FIG. 4A is a nested set notation for a cell manager object of MyAssy.asm;

FIG. 4B is a flow diagram illustrating relationships among a cell manager, a cell occurrence object, and a cell object;

FIG. 4C is a geometry to be assigned to a virtual component;

DESCRIPTION OF THE PREFERRED EMBODIMENT

Figure 1:
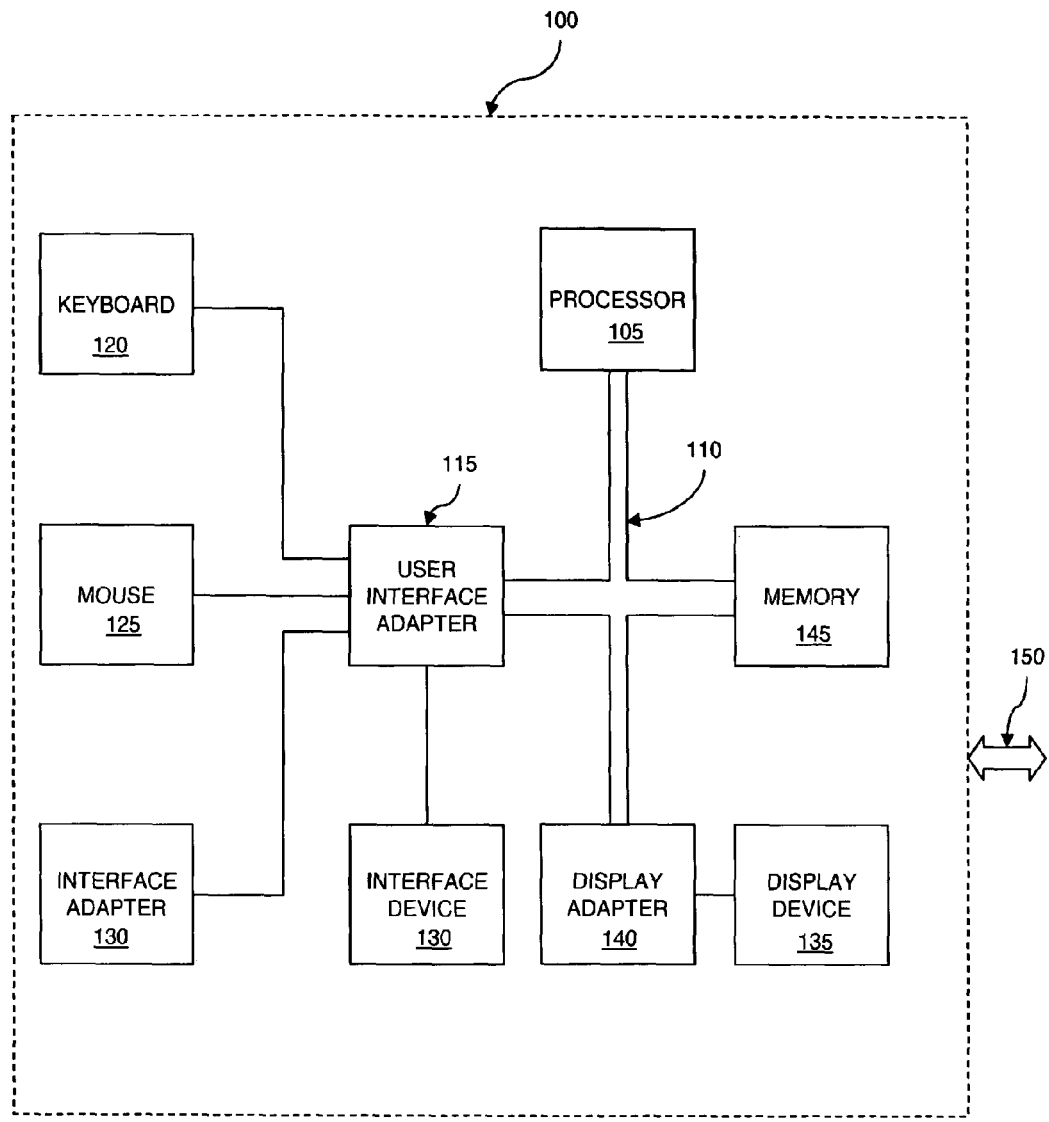
FIG. 1 is a block diagram of a computer environment in which the present invention may be practiced.

The present invention may be performed in any of a variety of known computing environments. The environment of FIG. 1 comprises a representative conventional computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The computer 100 typically includes a user interface adapter 115, which connects the microprocessor 105 via the bus 110 to one or more interface devices, such as a keyboard 120, a mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 communicates via a communications channel 150 with other computers or networks of computers. The computer 100 may be associated with such other computers in a local area network (LAN) or a wide area network (WAN), or it can be a client in a client/server arrangement with another computer, etc. All of these configurations, as well as the appropriate communications hardware and software, are known in the art.

Software programming code that can embody the present invention is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 3B:
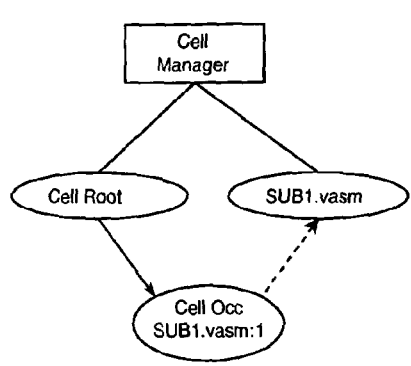
FIG. 3B is a flow diagram illustrating relationships among a cell manager, a cell occurrence object, and a cell object.
Figure 3C:
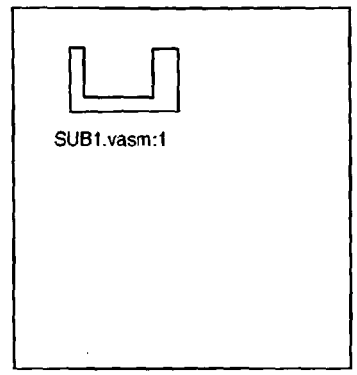
FIG. 3C is a geometry to be assigned to a virtual component.
Figure 3A:
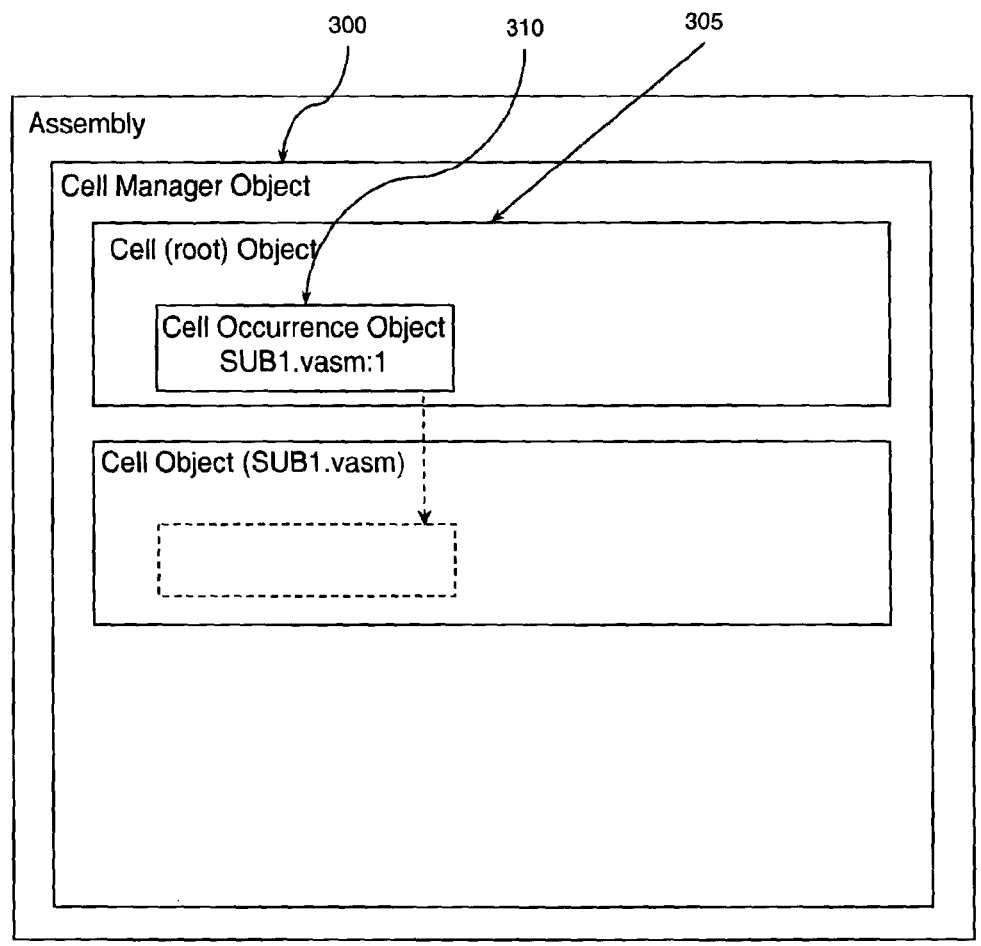
FIG. 3A is a nested set notation for a cell manager object of an Assembly.

The preferred embodiment of the present will now be described with reference to the Figures, wherein like numerals indicate like or corresponding parts throughout the several views. Referring now to FIGS. 3A-3C, the software programming code utilizes at least two programming objects, and preferably three, wherein said programming objects refer to objects as commonly understood to those skilled in the art of object-oriented programming. The preferred programming objects are a cell manager object 300, a cell object 305, and a cell occurrence object 310, wherein the cell manager object 300 is a top-level object that manages the relationships among at least one cell object 305 and at least one cell occurrence object 310.

The cell manager object 300, more particularly, manages the connection relationships among virtual components and the cell objects 305. For each real assembly there is preferably only one cell manager object 300 that manages the virtual components that are its children. Moreover it is the cell manager object 300 that manages a plurality of relationships of a master-slave occurrence involving the cell objects 305 and the cell occurrence objects 310.

The cell object 305, more particularly, is a virtual representation of a document that will be created on the non-volatile memory when a virtual component is published into the a component, to be discussed in more detail below. Further, the cell object 305 contains data for a geometry particular to the virtual component. Additionally, the cell object 305 may contain the cell occurrence objects 310 that maintain relationships among cell objects 305 contained in a virtual sub-assembly. The cell object also stores a plurality of property data.

The cell occurrence object 310, more particularly, is the virtual representation of a real reference object that exists in the real document upon publish wherein the real reference object is used to position the plurality of master-slave occurrences at publish. In a preferred practice, the designer would intend to insert a virtual component A.vpar 400 in a virtual assembly MyAssy.asm 405 that already has a virtual sub-assembly SUB1.vasm 410 as illustrated in FIGS. 4A-4C.

Figure 2:
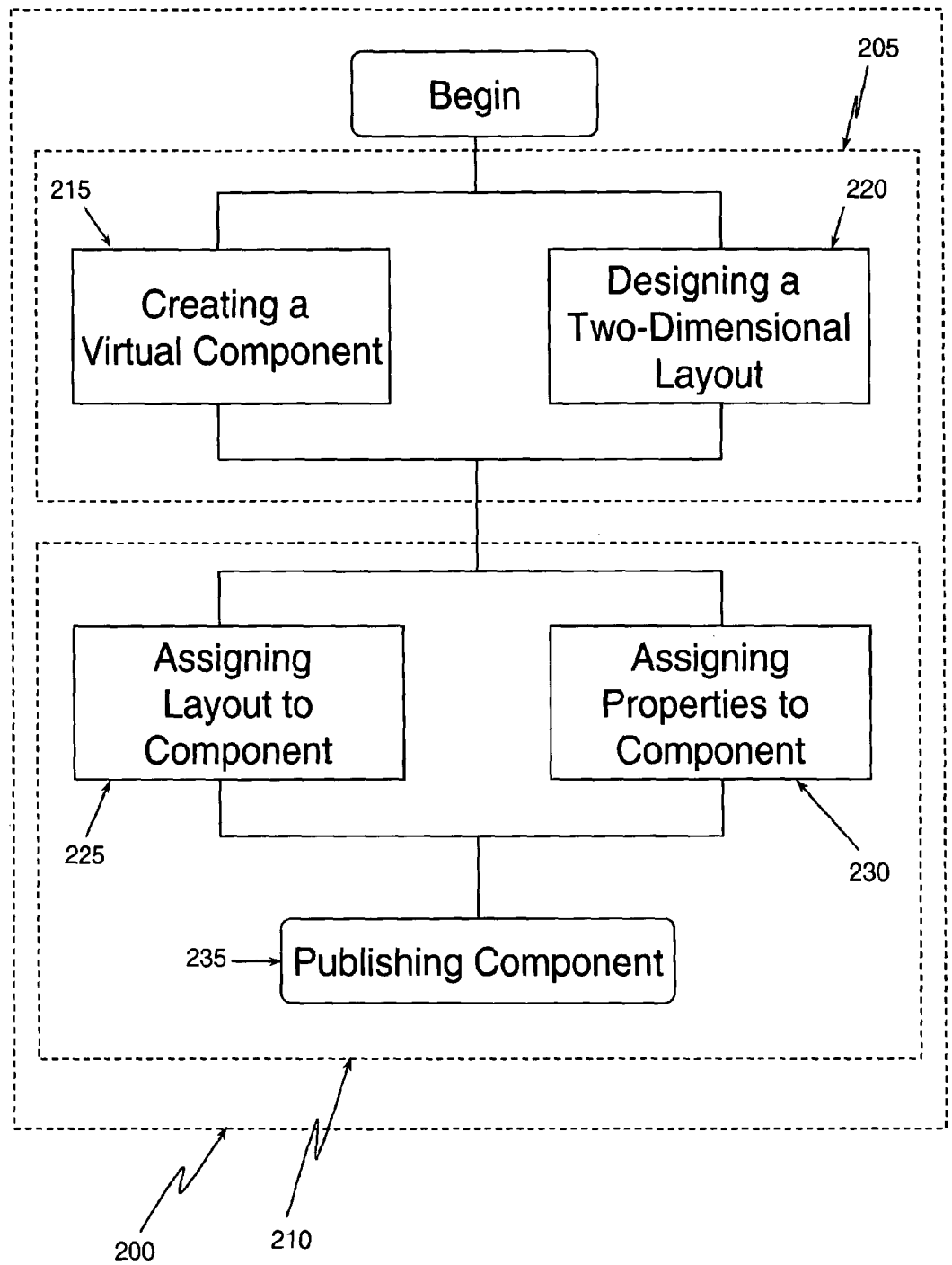
FIG. 2 is a flow diagram for the design and sub-design phases.

Referring now to FIG. 2, the preferred embodiment consists of a design process 200 in the software programming code with at least one major design phase, preferably two, described as an independent design phase 205, and a dependent design phase 210, respectively. The at least one major design phase is then sub-divided into at least one sub-design phase.

I. Independent Design Phase 205

A. Creating a Virtual Component Structure 215

1. Logic Flow for Virtual Component Insertion

Figure 5:
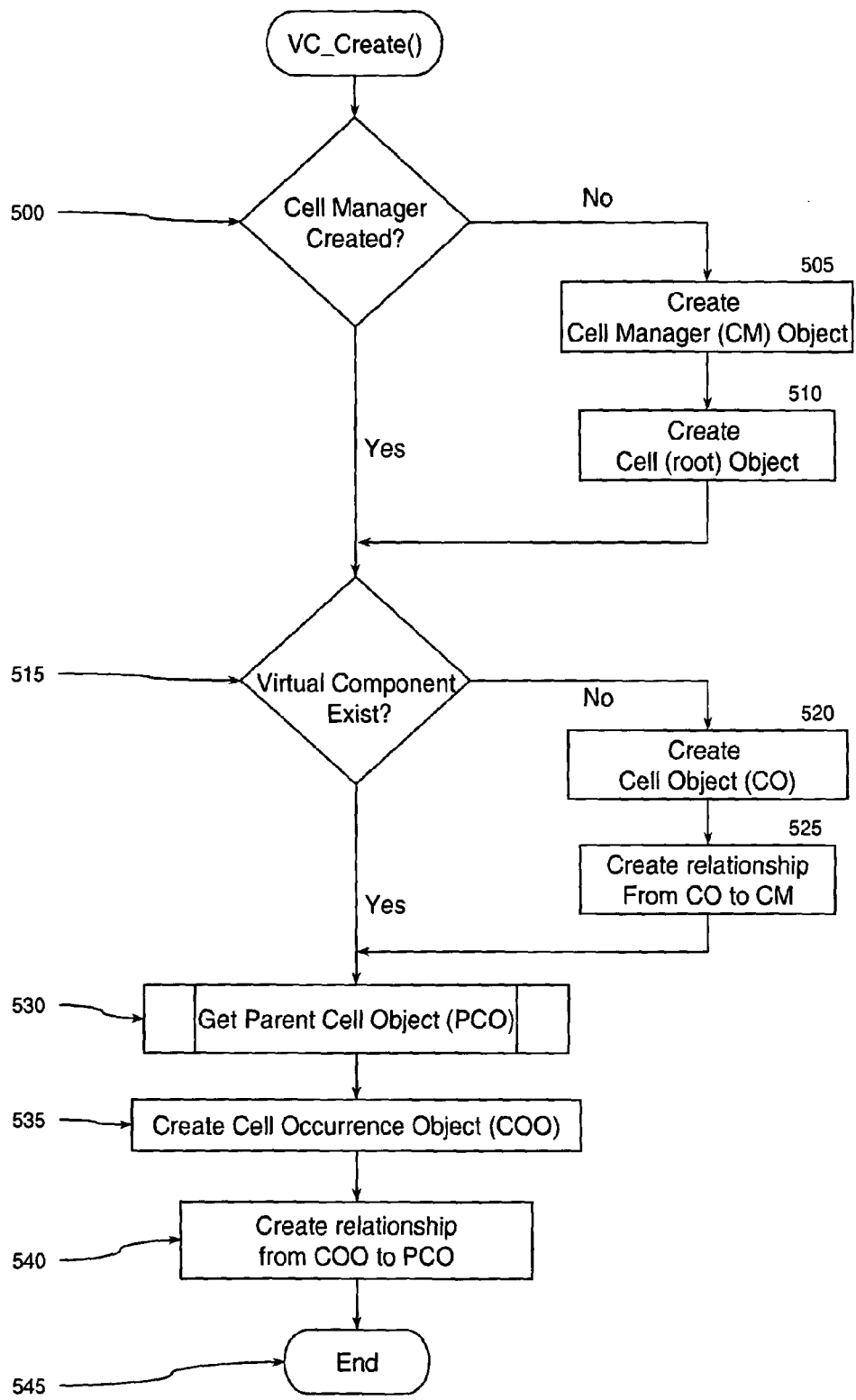
FIG. 5 is a logic flow diagram for a virtual component create procedure.

Referring now to FIG. 5, a flow diagram followed for the creation of a virtual component. To begin, if a cell manager is not created (Step 500no) the cell manager object (Step 505) and the cell root object (Step 510) are created. Else if the cell manager was created (Step 500yes), then continuing on it should be determined if the virtual component does exist. If the virtual component does not exist (Step 515no) a cell object (Step 520) is created and forms the relationship from the cell object to the cell manager (Step 525).

Continuing on, once the virtual component does exist (Step 515yes), the parent cell object is retrieved (Step 530); the cell occurrence object is created (Step 535); the relationship from the cell occurrence object to the parent cell object is formed (Step 540); and then finally exits (Step 545).

2. Application of Logic Flow

Figure 6:
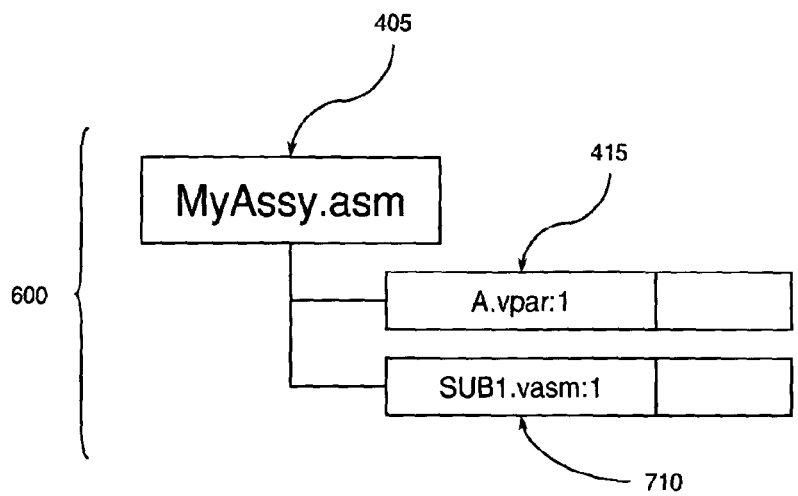
FIG. 6 is an indented hypertree view for a product structure.
Figure 7:
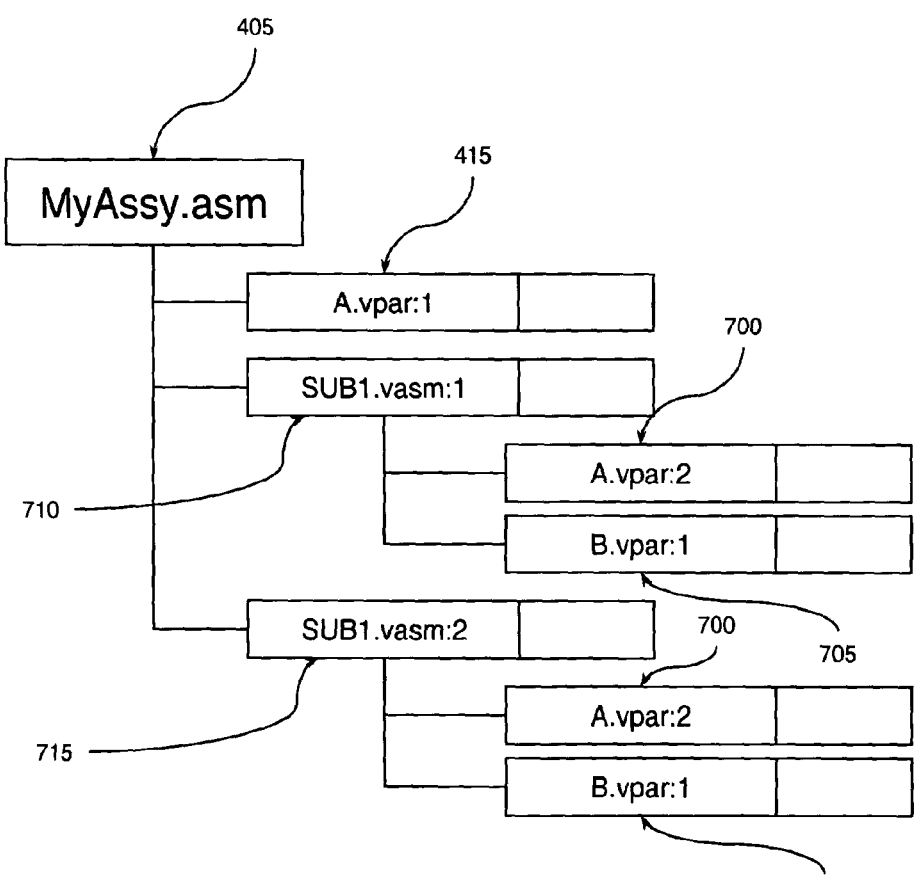
FIG. 7 is an indented hypertree view for a product structure with more components.

Referring now to FIGS. 6 & 7, both depict an indented hypertree view for a product structure of a virtual assembly. The program displays a graphical window representing a virtual component structure editor, generally shown in the indented hypertree view at 600. The virtual component structure editor 600 displays the virtual assembly from a top-down design hierarchy to logically insert a plurality of components, either virtual components or real components, necessary to define the virtual assembly without the need to create a plurality of computer files (not depicted) stored in the non-volatile memory. It is understood that the indented hypertree view is for component organization, but any mechanism to structure said components in a top-down hierarchical format can be used, for example a nested set notation depicted in FIG. 4A.

In accordance with the preferred embodiment when creating additional components within the MyAssy.asm 405, each additional occurrence of the same component is noted with a ":n+1" that may or may not be apparent to the designer, A.vpar:1 & A.vpar:2. Where, however, there is SUB1.vasm:1 and SUB1.vasm:2 that are two instance of the same virtual sub-assembly, the virtual components comprising the respective sub-assemblies have the same virtual components, SUB1.vasm:1 710 & SUB1.vasm:2 715.

B. Designing Geometry 220

The design of geometry 220, resulting in a geometry generally shown at 415, is accomplished utilizing methods and techniques well known in a computer-aided design industry (CAD/CAM/CAE), with applications such as SolidEdge®, and will not be discussed in further detail.

After completing the independent design phase 205 of Defining the Virtual Component Structure 215, and Designing Geometry 220, the designer continues to the dependent design phase 210 to eventually publish the virtual components into real component files.

II. Dependent Design Phase 210

A. Assigning Layout to Component 225

1. Logic Flow for Virtual Component Assignment

Figure 8:
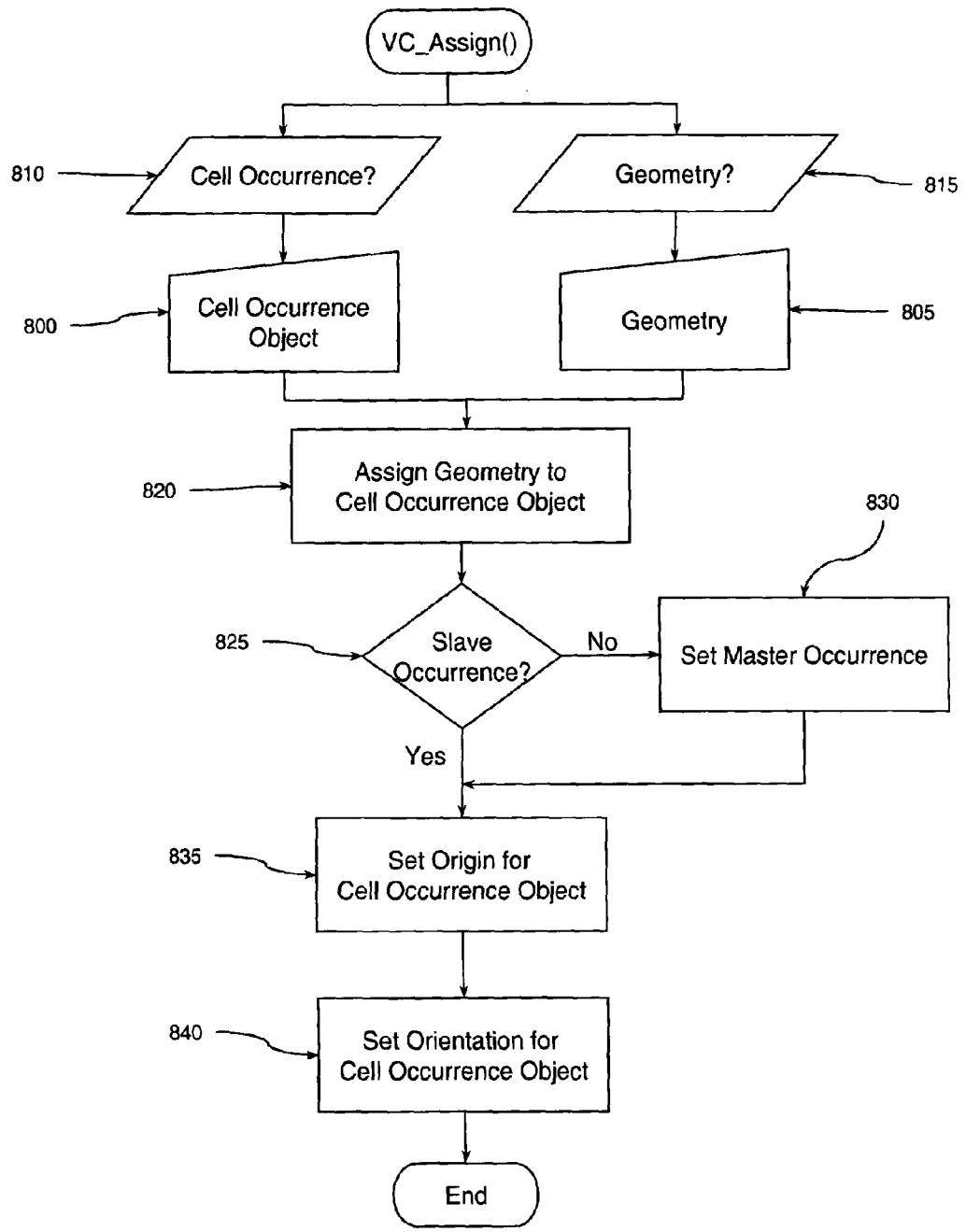
FIG. 8 is a logic flow diagram for a virtual component assign procedure.

Referring now to FIG. 8, the designer manually selects the geometry (Step 805) to assign to the cell occurrence object (Step 800). After manual selection, the selected geometry is assigned to the cell occurrence object (Step 820). If there the slave occurrence is not present (Step 825no), then the cell occurrence object is set to the master occurrence (Step 830).

Continuing on if there was a slave occurrence (Step 825yes) or if the master occurrence is set (Step 830), then the origin is set for the cell occurrence object (Step 835), and then the orientation for the cell occurrence object (Step 840).

2. Application of Logic Flow

Figure 9:
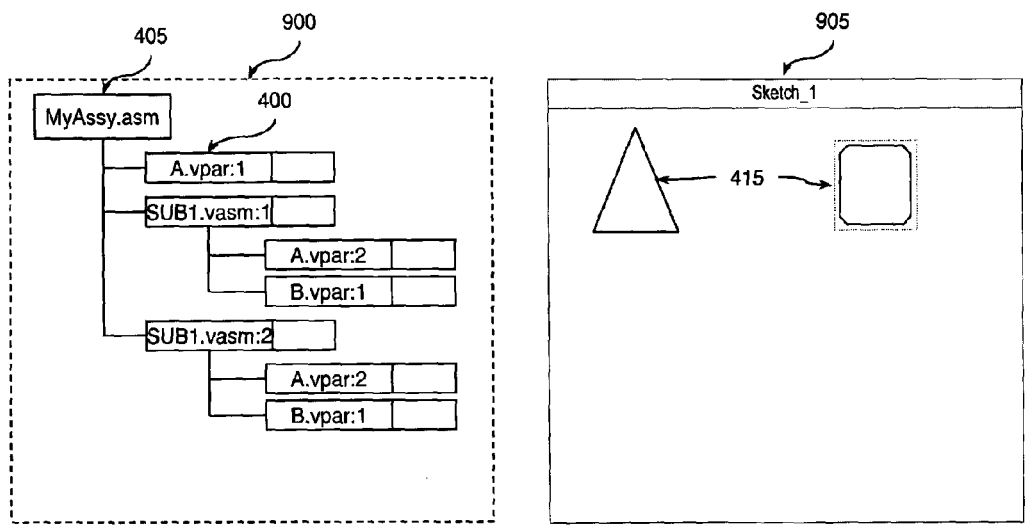
FIG. 9 is a two-window view displaying a virtual component structure editor and a geometry before geometry assignment.

Referring now to FIG. 9, the designer displays a plurality of window regions preferably at least two wherein an indented top-down design region generally depicted at 900 displays the indented hypertree view of the virtual component structure editor 600, and a graphic region generally depicted at 905 displays the geometry. The designer activates the geometry 415 by use of a button click on the mouse 125, or other similar input method, and selects a plurality of sections of the geometry 415. Alternatively, the designer can click on a portion of the geometry 415 that is a group formed with other sections of the geometry 415 that has formed a grouped object, wherein the grouped object is composed of several smaller units, etc., and treated as one single unit.

Figure 10:
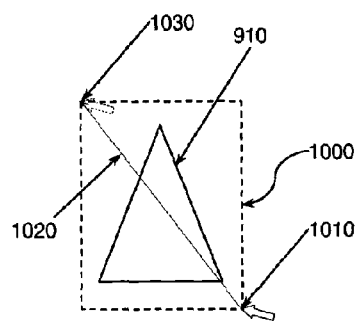
FIG. 10 illustrates a fence creation to select a geometry.

And in yet another alternative as depicted in FIG. 10, the designer could have created a fence 1000 around the geometry 415, where the fence 1000 is created by starting at a fence origin 1010 with the button click or other method to set the fence origin 1010, and dragging a pointing device away 1020 from the fence origin 1010 to an opposing point generally depicted at 1030, thereby creating the fence 1000.

Figure 11:
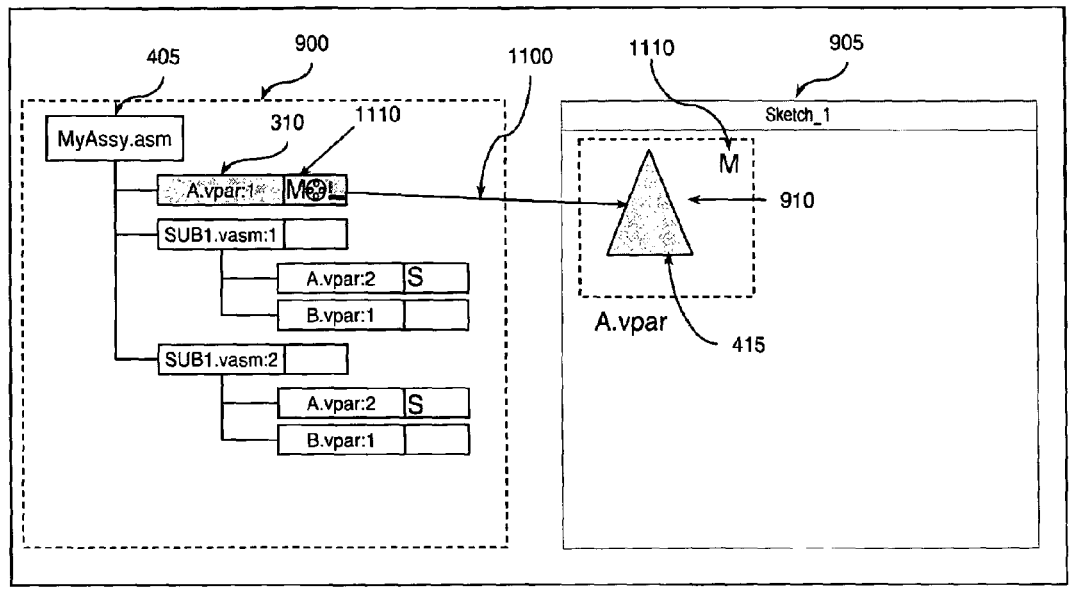
FIG. 11 is a two-window view displaying a virtual component structure editor and a geometry after geometry assignment.
Figure 12:
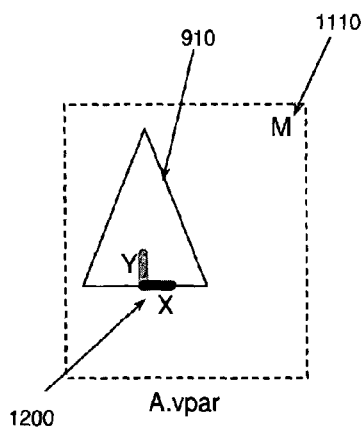
FIG. 12 is a geometry with an origin and an orientation placed assigned to a virtual component.

Referring now to FIGS. 11 & 12, A.vpar 400 is the cell occurrence object 310 as indicated with the highlighted shading, and the designer activates the geometry 415, as illustrated at 910, to assign the geometry to the cell occurrence object 310, as illustrated at 1100.

After assigning the geometry, the first occurrence of A.vpar:1 is set to the master occurrence, as indicated by an "M" character 1110. Next, the designer sets the origin of the cell occurrence object 310 on the geometry 415 by selecting a point on the geometry 415 that is preferably a midpoint or a vertex of the geometry 415 but can be any point on the geometry 415. The designer then selects and sets an orientation of the cell occurrence object 310 for a positive axis generally depicted at 1200. The positive axis 1200, orients and positions the geometry 415 on a x-y plane in this illustration, but the designer could have selected the cell occurrence object 310 to orient along the x-z plane or the y-z plane.

Figure 13:
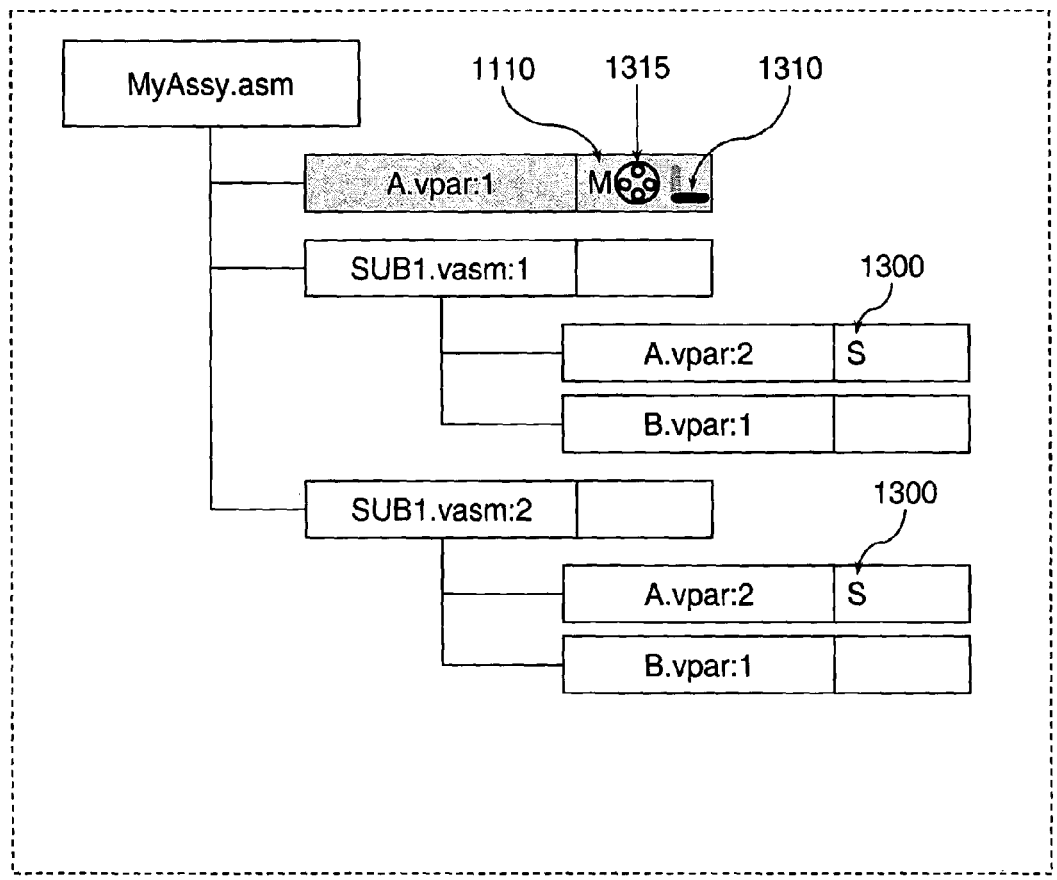
FIG. 13 is an indented hypertree with additional glyphs to identify assignment.

Referring now to FIG. 13, because there are multiple occurrences of A.vpar, the remaining cell occurrence objects for A.vpar:n+1 are slave components, denoted by an "S" character 1315. Also illustrated in this example are a plurality of glyphs that indicate the state of the assignment operation, in accordance with the procedure illustrated in FIG. 8. For example, a graphic glyph 1300 indicates the completion of assigning the geometry to the cell occurrence object, and a position glyph 1310 indicates the cell occurrence object has been assigned its origin and orientation 1200.

B. Assigning Component Properties 230

Figure 14:
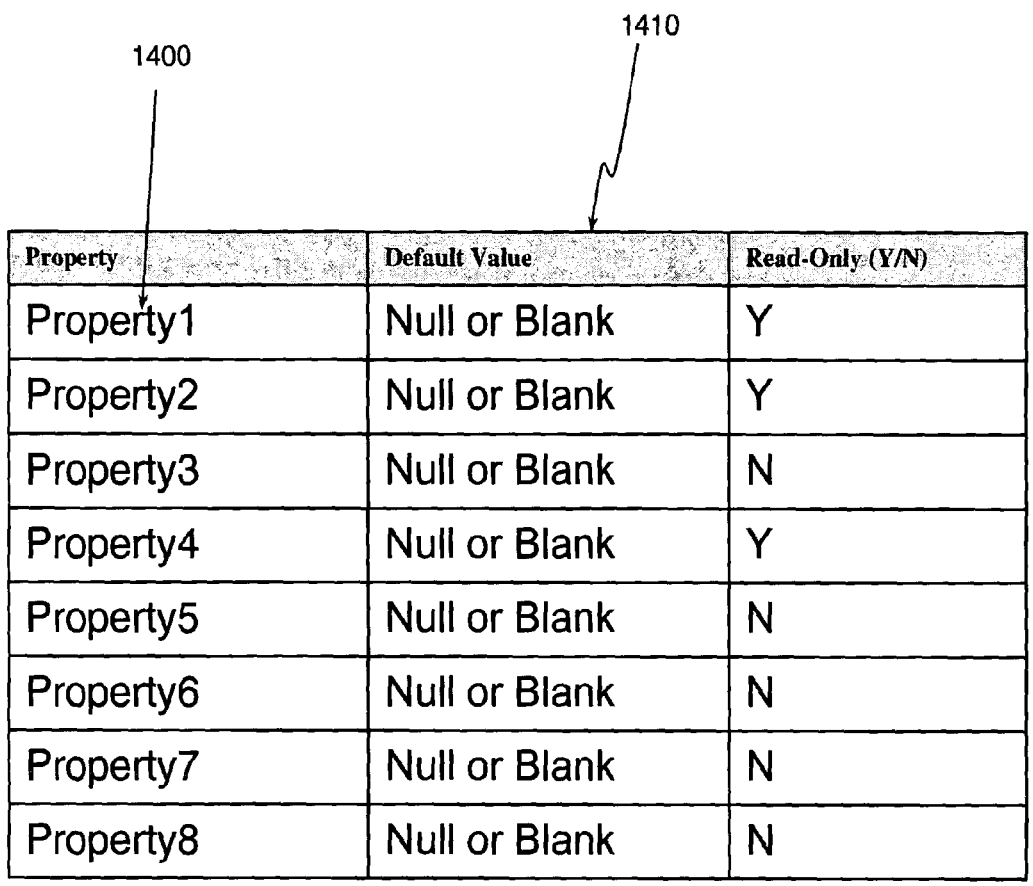
FIG. 14 is a table with example properties assigned to a virtual component.

Referring now to FIG. 14, the designer may assign a data property 1400 to a component data property set 1410. The component data property set 1410 contains a plurality of information. The information can be, for example, relevant to writing at least one report and creating a bill of materials (BOM), for example. Commonly used data property 1400 can, for example, include name, material, document id, creation date, and save date. The BOM can be created on the assembly, even though the components are virtual and do not exist as files on the non-volatile storage medium.

C. Publishing Component 235

Once the designer has created the virtual component structure 215, designed the geometry 220, and assigned the layout to the component 225, the designer can then proceed to Publishing Component 235 into a real assembly comprised of three-dimensional (3D) components and create a document set corresponding to the real assembly.

1. Logic Flow for Component Publishing

Figure 15:
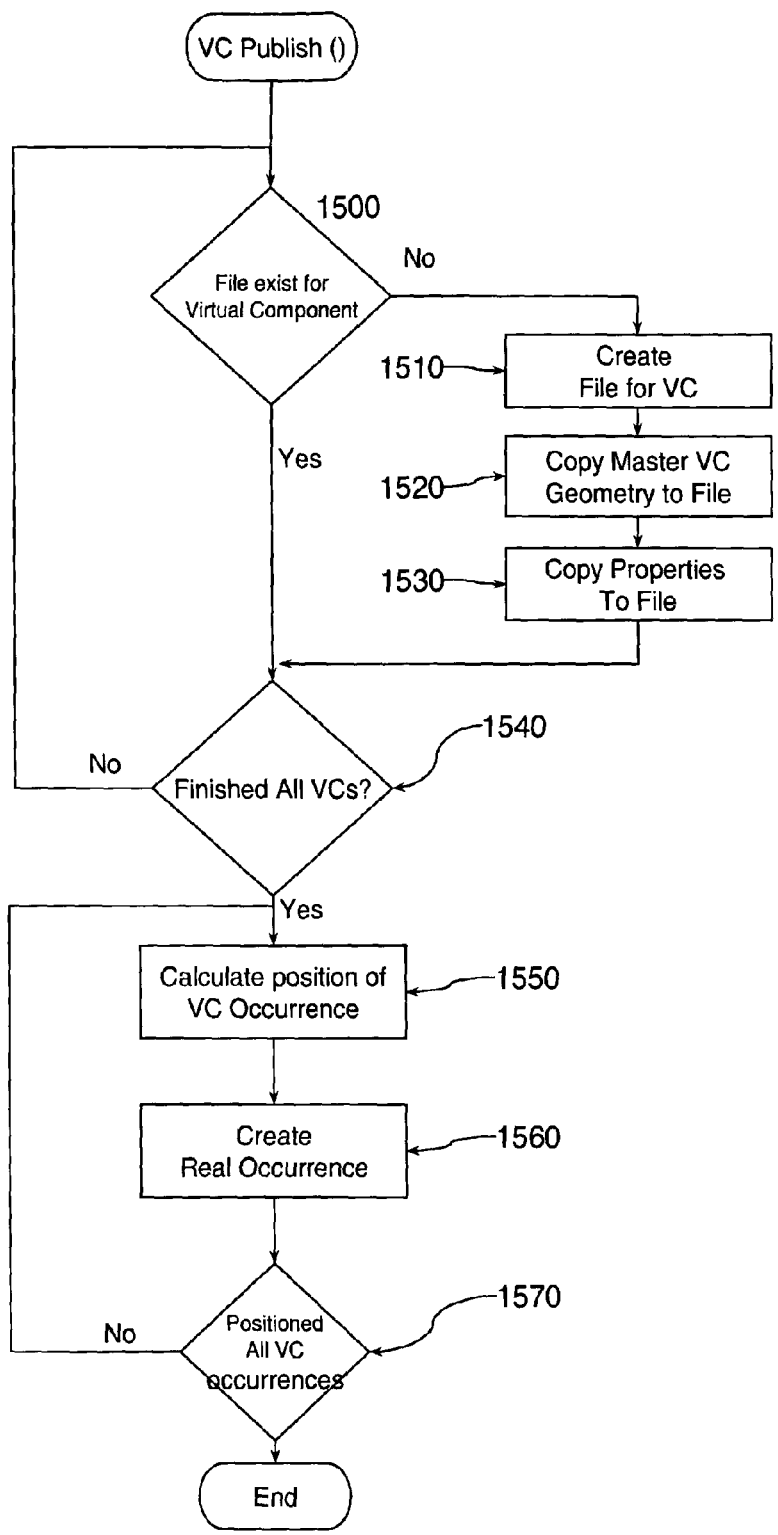
FIG. 15 is a logic flow diagram for a virtual component publish procedure.
Figure 16:
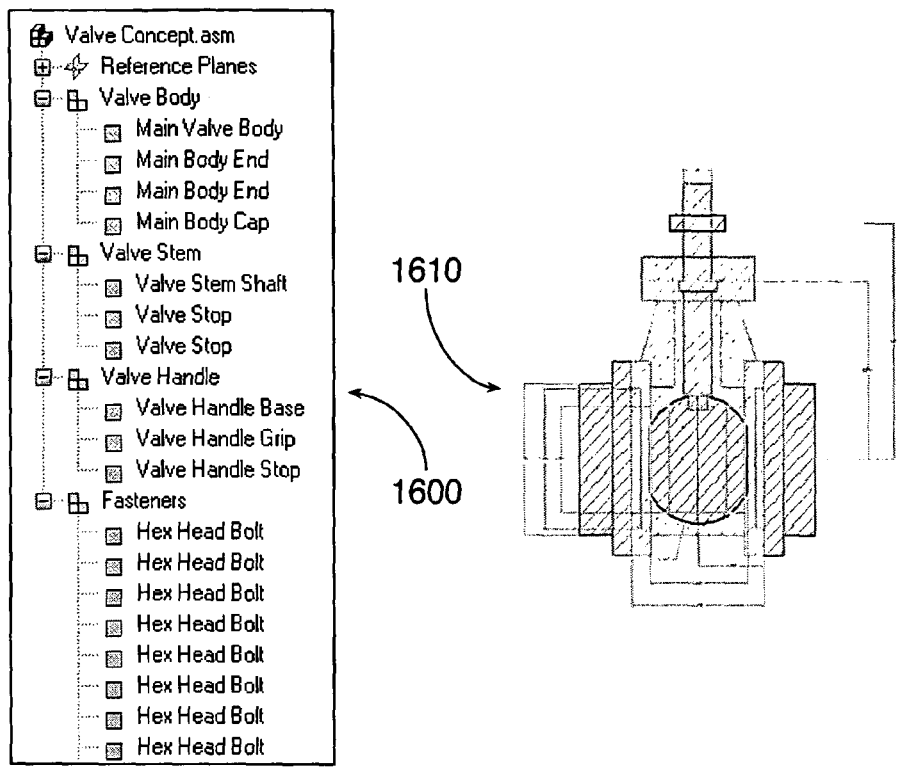
FIG. 16 illustrates a virtual component structure editor and a corresponding geometry for a virtual structure.
Figure 17:
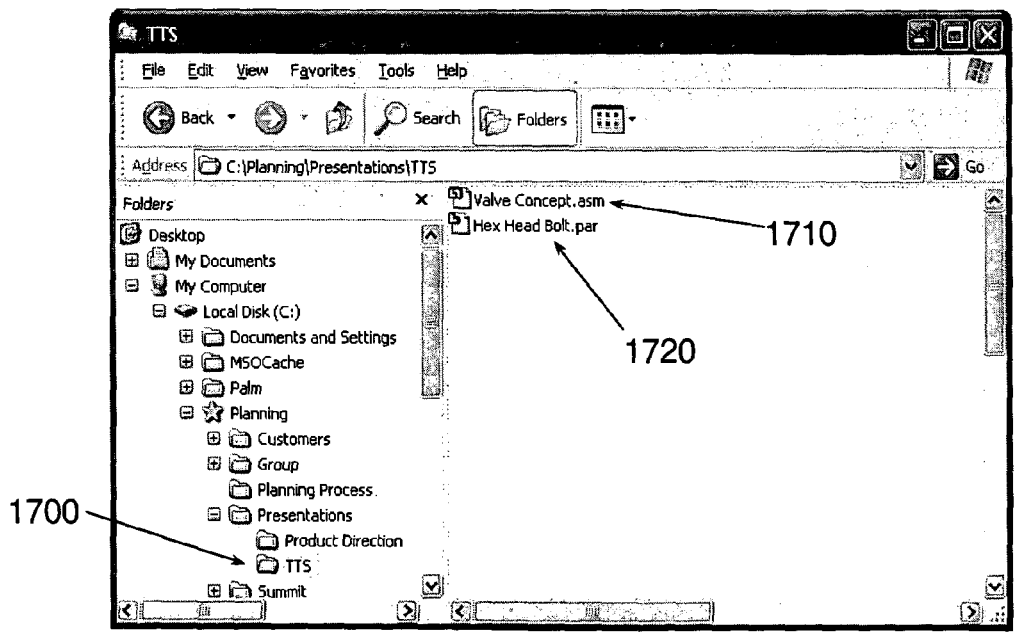
FIG. 17 is a window illustrating directory structure before component publishing.
Figure 18:
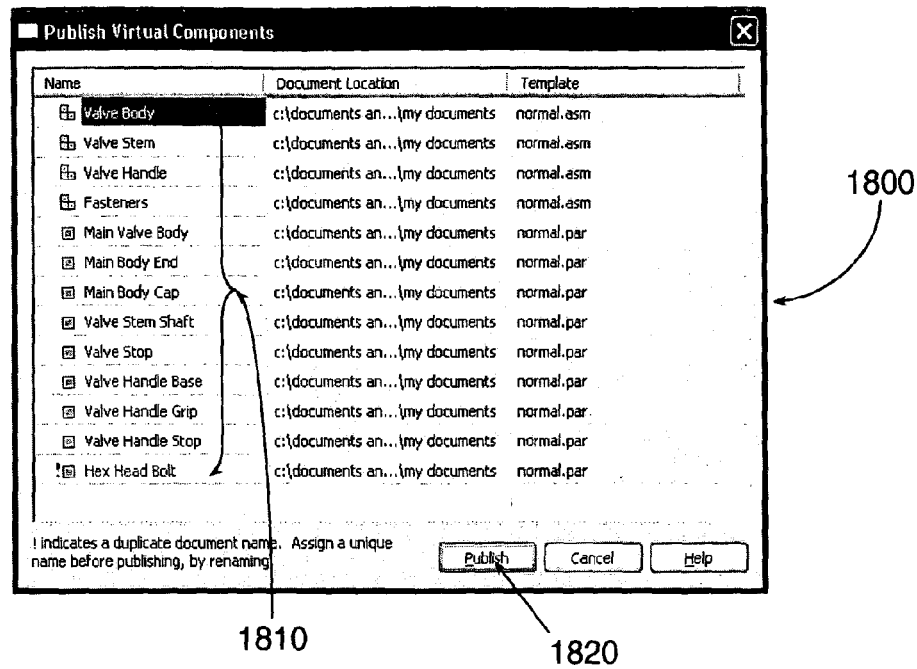
FIG. 18 is a window listing a plurality of virtual components and corresponding templates with document locations noted.
Figure 19:
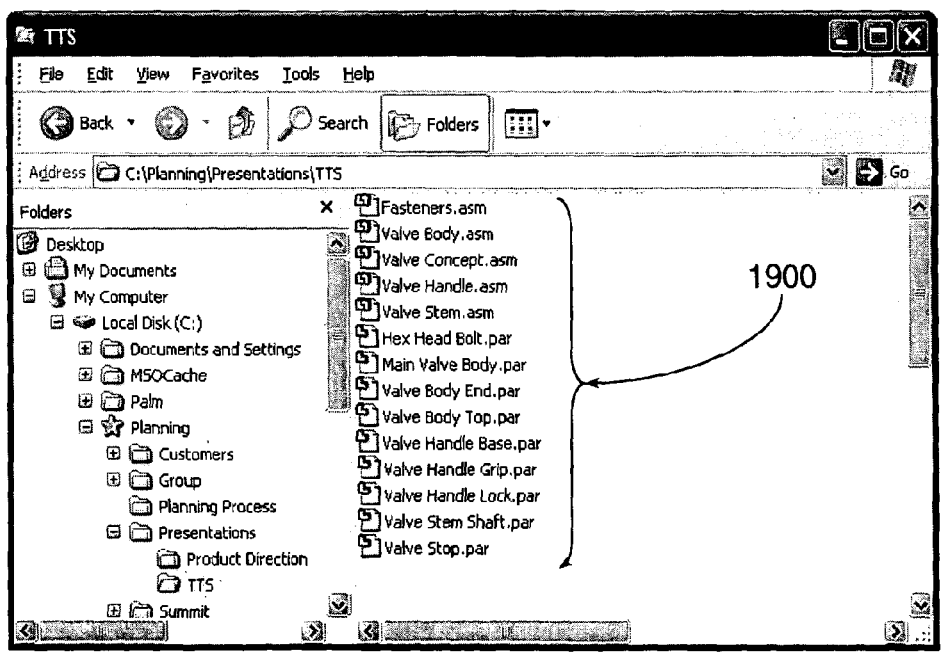
FIG. 19 is a window illustrating directory structure after component publishing.

Referring now to FIG. 15, to begin determine if the real file exists for the virtual component. If the real file does not exist (Step 1500no) then create a real file (Step 1510), copy the geometry for the master occurrence (Step 1520) where the geometry information also includes the plane data with the axis for orientation, as well as the cell origin and cell orientation, and copy all cell properties to the real file (Step 1530). Once the real files for all the virtual components (Step 1500yes), determine if there are any more virtual components missing real files (Step 1540no).

Continuing on, once all of the virtual components have corresponding real files (Step 1540yes), then calculating the position of the cell occurrence object (Step 1550) based on the orientation from the cell occurrence object in conjunction with the orientation of the corresponding cell object geometry, and set the real occurrence within the real file (Step 1560). Continuing on, if all of the occurrence for all of the virtual components have not been published (Step 1570no), then return to calculate the position of the cell occurrence object (Step 1550), otherwise exit (Step 1570yes).

2. Application of Logic Flow

Referring now to FIGS. 16-20, the designer created a valve concept virtual structure (assembly) utilizing the indented hypertree of the virtual component structure editor 600, as partially illustrated at 1600. The designer also utilized a CAD application to create the valve concept geometry generally indicated at 1610. Prior to Publishing Component 235, a parent folder 1700 for the project contains only a top-level assembly file 1710 and a part file 1720. The initiation and the execution of the virtual component publish command presents a window 1800 with the virtual components represented and generally indicated at 1810.

When a publish button 1820 is selected, the system creates a plurality of required component files by first placing the master component geometry in the real file aligning the cell origin and orientation with a component model space origin, as well as placing the geometry on the specified reference plane. Once the real component is created with the geometry from the master occurrence, the real component is placed back in the original assembly matching the real component model space origin with the cell orientations in the original assembly. If the component file is pre-existing, the existing file is placed in the assembly matching the model space coordinate system to the cell orientation.

Figures 20, 21:
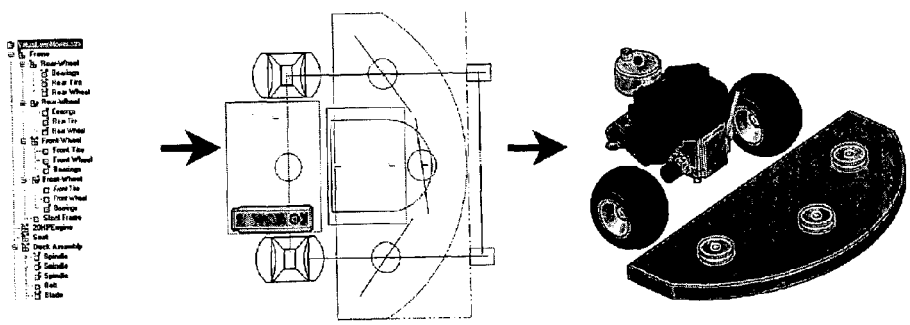
FIG. 20 is a component editor with a real structure characterized by an indented hypertree after a component publishing.
FIG. 21 is an example of transforming a real structure from a component editor into a real assembly.

Following the Publishing Component 235 the folder location is now populated with real files 1900. Turning back to the virtual component structure editor 600 with the original assembly file, the virtual structure is replaced with the real structure 2000 created during component publishing. Once the geometry has been distributed to the components during component publishing, the designer can then complete detailed component design as illustrated in FIG. 21.

III. Conclusion

The invention may be implemented in digital electronic circuitry, or in computer hardware, firmware, software, or in combinations thereof. An apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, these and other implementations are within the scope of the following claims.

What is claimed is:

1. A method of creating a plurality of documents from a three-dimensional assembly represented by a single document, comprising the steps of:
   creating a plurality of components associated with a plurality of instance data from said single document, by a computer system, wherein said instance data comprises at least data pertaining to an origin and an orientation for each of said components; and
   publishing, by the computer system, an assembly into said plurality of documents corresponding to each of said plurality of components, including
      associating geometry, where said geometry comprises one of real or virtual,
      creating a new document for each of said plurality of components,
      transforming an origin and an orientation for each of said components into said corresponding new document,
      transferring a plurality of attributes from each of said plurality of components into said corresponding new documents, and
      replacing said plurality of components in said single document with a link to said corresponding new document,
   whereby a three-dimensional assembly representation of the assembly is created from said plurality of documents.

2. A non-transitory machine readable medium encoded with executable instructions that, when executed, cause a computer to perform a method of creating a plurality of documents from a three-dimensional assembly represented by a single document, comprising:
   instructions for creating a plurality of components associated with a plurality of instance data from said single document; wherein said instance data comprises at least data pertaining to an origin and an orientation for each of said components; and
   instructions for publishing an assembly into said plurality of documents corresponding to each of said plurality of components, including
      instructions for creating a new document for each of said plurality of components,
      instructions for transforming an origin and an orientation for each of said components into said corresponding new document,
      instructions for transferring a plurality of attributes from each of said plurality of components into said corresponding new documents, and
      instructions for replacing said plurality of components in said single document with a link to said corresponding new document.

3. A method of creating a plurality of documents from a three-dimensional assembly represented by a single document, comprising the steps of:
   creating, by a computer system, a plurality of components associated with a plurality of instance data from said single document; wherein said instance data comprises at least data pertaining to an origin and an orientation for each of said components; and
   publishing, by the computer system, an assembly into said plurality of documents corresponding to each of said plurality of components, comprising the steps of:
      creating a new document for each of said plurality of components;
      transforming an origin and an orientation for each of said components into said corresponding new document;
      transferring a plurality of attributes from each of said plurality of components into said corresponding new documents; and
      replacing said plurality of components in said single document with a link to said corresponding new document;
   whereby a three-dimensional assembly representation of the assembly is created from said plurality of documents.

* * * * *